United States Patent [19]
Petrunka et al.

[11] Patent Number: 5,987,115
[45] Date of Patent: Nov. 16, 1999

[54] SYSTEMS AND METHODS FOR SERVICING CALLS BY SERVICE AGENTS CONNECTED VIA STANDARD TELEPHONE LINES

[75] Inventors: Robert W. Petrunka, Raleigh; Robert L. Smith, Cary, both of N.C.

[73] Assignee: Northern Telecom Limited, Canada

[21] Appl. No.: 08/833,990

[22] Filed: Apr. 11, 1997

Related U.S. Application Data

[63] Continuation-in-part of application No. 08/760,111, Dec. 3, 1996.

[51] Int. Cl.⁶ ..................................................... H04M 3/42
[52] U.S. Cl. ...................... 379/265; 379/88.18; 379/229; 379/266
[58] Field of Search ..................................... 379/265, 266, 379/309, 112, 113, 114, 115, 201, 211, 219, 220, 221, 88.18, 229, 230

[56] References Cited

U.S. PATENT DOCUMENTS

| | | | |
|---|---|---|---|
| 4,048,452 | 9/1977 | Oehring et al. | 179/27 |
| 4,289,934 | 9/1981 | Pitroda et al. | 179/27 |
| 4,466,098 | 8/1984 | Southard | 371/9 |
| 4,674,036 | 6/1987 | Conforti | 364/200 |
| 4,700,381 | 10/1987 | Eher | 379/279 |
| 4,737,983 | 4/1988 | Frauenthal et al. | 379/221 |
| 4,755,995 | 7/1988 | Anderson et al. | 371/9 |
| 4,763,353 | 8/1988 | Canale et al. | 379/265 |
| 4,866,763 | 9/1989 | Cooper et al. | 379/221 |
| 4,881,261 | 11/1989 | Oliphant et al. | 379/215 |
| 4,893,301 | 1/1990 | Andrews et al. | 370/58.2 |
| 4,951,310 | 8/1990 | Honda et al. | 379/266 |
| 4,988,209 | 1/1991 | Davidson et al. | 370/58.2 |
| 5,008,930 | 4/1991 | Gawrys et al. | 379/210 |
| 5,023,868 | 6/1991 | Davidson et al. | 370/62 |
| 5,031,211 | 7/1991 | Nagai et al. | 379/221 |
| 5,036,535 | 7/1991 | Gechter et al. | 379/210 |

(List continued on next page.)

FOREIGN PATENT DOCUMENTS

| | | |
|---|---|---|
| 0 424 015 A2 | 4/1991 | European Pat. Off. . |
| 0 539 104 A2 | 4/1993 | European Pat. Off. ............... 379/265 |
| 0 545 266A | 6/1993 | European Pat. Off. ............ 379/88.18 |
| 0 647 051 A1 | 9/1994 | European Pat. Off. ............... 379/266 |
| 0 622 938 A2 | 11/1994 | European Pat. Off. ............... 379/265 |
| 0 710 042 A2 | 5/1996 | European Pat. Off. ............... 379/207 |
| 0 753 956 | 1/1997 | European Pat. Off. ............ 379/88.16 |
| 0 802 665 A2 | 10/1997 | European Pat. Off. ............... 379/265 |
| 2 298 761 A | 9/1996 | United Kingdom . |
| WO 94/00945 | 1/1994 | WIPO .................................... 379/212 |
| WO 98/01987 | 1/1998 | WIPO .................................... 379/265 |

OTHER PUBLICATIONS

Giordano et al., "PCS Number Portability", IEEE/ICCC, pp. 1146–1150, 1994.
Japanese Patent Abstract Publication No. 07170288, dated Jul. 4, 1995.
Harvey, D.E. et al., "Call Center Solutions," AT&T Technical Journal, vol. 70, No. 5, Sep. 1, 1991, pp. 36–44.

*Primary Examiner*—Scott Wolinsky
*Attorney, Agent, or Firm*—Finnegan, Henderson, Farabow, Garrett & Dunner, L.L.P.

[57] ABSTRACT

A call servicing system facilitates the servicing of customer calls by service agents. The call servicing system includes local customer switches, local agents switches, a network switch, and an Automatic Call Distribution (ACD) server. The local customer switches direct calls to and from the customers and the local agent switches direct calls to and from the service agents. Remote service agents connect to the local agent switches using a single standard telephone line. The network receives a call from one of the customers, detects information from the customer call, and routes the customer call to a remote service agent over the single standard telephone line. The ACD server receives the detected information from the network switch, determines that the remote service agent can service the customer call, and controls the network switch to route the customer call to the remote service agent over the single standard telephone line.

9 Claims, 9 Drawing Sheets

U.S. PATENT DOCUMENTS

| | | |
|---|---|---|
| 5,062,103 | 10/1991 | Davidson et al. ............... 370/58.1 |
| 5,073,890 | 12/1991 | Danielsen ....................... 370/58.2 |
| 5,099,509 | 3/1992 | Morganstein et al. ............ 379/84 |
| 5,109,404 | 4/1992 | Katz et al. ........................ 379/265 |
| 5,113,430 | 5/1992 | Richardson, Jr. et al. ........ 379/88 |
| 5,153,909 | 10/1992 | Beckle et al. .................... 379/265 |
| 5,175,866 | 12/1992 | Childress et al. ................ 455/8 |
| 5,193,110 | 3/1993 | Jones et al. ...................... 379/94 |
| 5,214,688 | 5/1993 | Szlam et al. ...................... 379/67 |
| 5,271,058 | 12/1993 | Andrews et al. ................. 379/210 |
| 5,291,492 | 3/1994 | Andrews et al. ................. 370/110.1 |
| 5,291,550 | 3/1994 | Levy et al. ........................ 379/242 |
| 5,291,551 | 3/1994 | Conn et al. ....................... 379/265 |
| 5,309,504 | 5/1994 | Morganstein ..................... 379/265 |
| 5,309,505 | 5/1994 | Szlam et al. ...................... 379/88 |
| 5,309,513 | 5/1994 | Rose .................................. 379/265 |
| 5,317,627 | 5/1994 | Richardson, Jr. et al. ........ 379/88 |
| 5,335,268 | 8/1994 | Kelly, Jr. et al. ................. 379/112 |
| 5,335,269 | 8/1994 | Steinlicht ........................... 379/266 |
| 5,341,374 | 8/1994 | Lewen et al. ..................... 370/85.4 |
| 5,353,339 | 10/1994 | Scobee .............................. 379/207 |
| 5,355,403 | 10/1994 | Richardson, Jr. et al. ........ 379/88 |
| 5,392,345 | 2/1995 | Otto ................................... 379/265 |
| 5,392,346 | 2/1995 | Hassler et al. .................... 379/265 |
| 5,402,474 | 3/1995 | Miller et al. ...................... 379/93 |
| 5,404,350 | 4/1995 | DeVito et al. .................... 370/16 |
| 5,450,482 | 9/1995 | Chen et al. ........................ 379/207 |
| 5,452,350 | 9/1995 | Reynolds et al. ................. 379/220 |
| 5,459,780 | 10/1995 | Sand .................................. 379/265 |
| 5,526,353 | 6/1996 | Henley et al. ..................... 370/392 |
| 5,530,744 | 6/1996 | Charalambous et al. ......... 379/112 |
| 5,546,452 | 8/1996 | Andrews et al. ................. 379/219 |
| 5,555,299 | 9/1996 | Maloney et al. .................. 379/212 |
| 5,592,542 | 1/1997 | Honda et al. ..................... 379/265 |
| 5,633,924 | 5/1997 | Kaish et al. ....................... 379/266 |
| 5,696,809 | 12/1997 | Voit ................................... 379/266 |
| 5,742,675 | 4/1998 | Kilander et al. .................. 379/266 |
| 5,745,550 | 4/1998 | Eisdorfer et al. ................. 379/266 |
| 5,778,060 | 7/1998 | Otto ................................... 379/265 |
| 5,790,650 | 8/1998 | Dunn et al. ....................... 379/265 |
| 5,809,130 | 9/1998 | Ayala ................................. 379/266 |

FIG. 8

SYSTEMS AND METHODS FOR SERVICING CALLS BY SERVICE AGENTS CONNECTED VIA STANDARD TELEPHONE LINES

RELATED APPLICATIONS

This application is a continuation-in-part of U.S. application Ser. No. 08/760,111, filed Dec. 3, 1996, and related to U.S. application Ser. No. 08/833,997, filed Apr. 11, 1997 both of which are incorporated by reference.

BACKGROUND OF THE INVENTION

The present invention relates generally to a call management system and more particularly to a network in which remote agents connect over standard telephone lines to service customer calls.

Many businesses use agents or operators to service customers by telephone. These businesses often employ several agents connected to an Automatic Call Distribution (ACD) system, such as a Meridian® ACD manufactured by Northern Telecom, Ltd., to handle multiple calls simultaneously. The call center technology distributes the calls (usually dialed with a toll free number) to the agents.

There are three principal types of call center technology: standalone ACDs, ACDs integrated with a Private Branch Exchange (PBX), and central office based ACDs. The most commonly used type is the ACD integrated with a PBX.

Conventional call centers require agents to have a direct line connection to a local ACD. The ACD handles the routing of calls to the agents and provides management and reporting functions. The direct line connection limited, however, the distance from the local ACD agents could locate.

Because many businesses want to be able to locate their agents at various locations, even ones remote from an ACD, some conventional call centers have technology to allow remote access. These conventional call centers require, in addition to a voice path, a data path to exist between the remote agent's location and the local ACD to report status changes, such as logging on, logging off, and agent availability.

Some call centers use an Integrated Services Digital Network (ISDN) line as the data path from the local ACD to the remote agent's location, while others use a second standard telephone line as the data path. Still other centers use special circuitry to permanently monitor dual tone multi-frequency (DTMF) tones on a standard telephone line of the remote agent. This special circuitry effectively provides the data path to the local ACD through which the remote agent reports status changes.

To provide this reporting functionality, these conventional call centers add significant costs to the remote agent function by requiring an additional data path or special circuitry. Additionally, establishing the data path from the remote agent location to a local, centralized ACD can be complex and difficult to achieve, further limiting the economic viability of the remote agent concept.

SUMMARY OF THE INVENTION

The present invention addresses this problem by permitting remote agents to connect to a standard local switch over a standard telephone line, thereby eliminating the requirement for an additional data path, special circuitry, or a connection to a local ACD.

In accordance with the purpose of the invention as embodied and broadly described herein, the call servicing system according to the principles of the present invention facilitates the servicing of customer calls by service agents. The call servicing system includes local customer switches, local agents switches, a network switch, and an Automatic Call Distribution (ACD) server.

The local customer switches direct calls to and from the customers and the local agent switches direct calls to and from the service agents. Remote service agents connect to the local agent switches using a single standard telephone line. The network receives a call from one of the customers, detects information from the customer call, and routes the customer call to a remote service agent over the single standard telephone line. The ACD server receives the detected information from the network switch, determines that the remote service agent can service the customer call, and controls the network switch to route the customer call to the remote service agent over the single standard telephone line.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers identify the same or similar elements.

The description includes exemplary embodiments, other embodiments are possible, and changes may be made to the embodiments described without departing from the spirit and scope of the invention. The following detailed description does not limit the invention. Instead, the scope of the invention is defined only by the appended claims.

Systems and methods consistent with the principles of the present invention facilitate remote agent servicing by permitting a remote agent at any physical location to service customer calls through a standard local switch using a standard telephone line.

I. Network Elements

Figure 1:
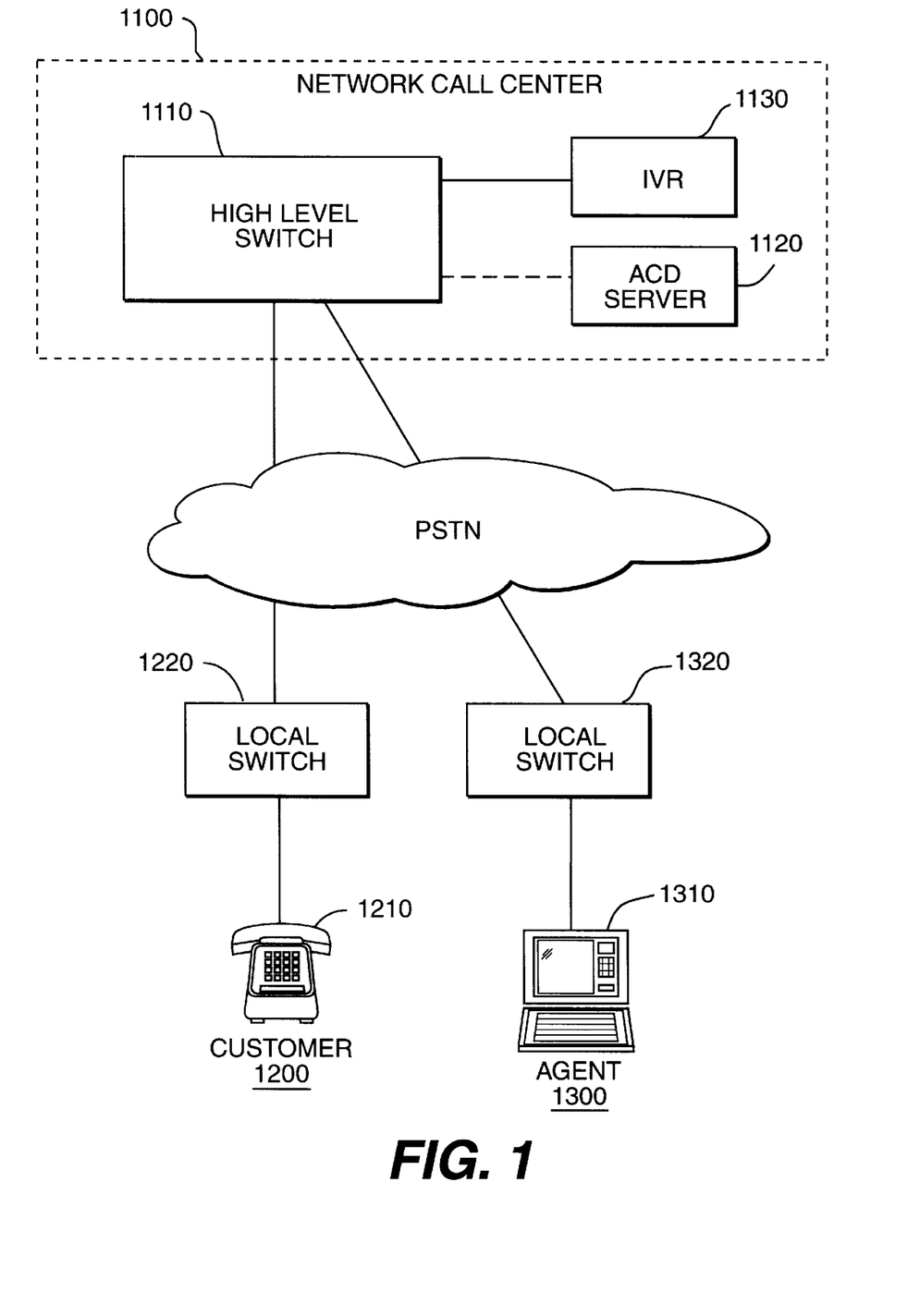
FIG. 1 is a diagram of a communications network consistent with the principles of the present invention.

FIG. 1 is a block diagram of a communications network consistent with the principles of the present invention.

Network Call Center (NCC) 1100 connects customer 1200 to agent 1300 of a virtual team of agents. A single customer and a single agent have been shown for simplicity. The present invention does not require any specific number of customers and agents, but encompasses any number of customers and agents connected to any switch in the network.

Customer 1200 uses a conventional telephone 1210 to communicate with an agent in a virtual agent team through NCC 1100 using the public network, such as the Public Switched Telephone Network (PSTN). Switch 1220 is a standard PBX or Class 5 telephone switch, and connects customer 1200 to NCC 1100 over a standard telephone line.

To service customer calls, agent 1300 may use a number of different telephone line terminals, such as a standard telephone (not shown) or computer 1310 with a telephony card installed. Agent computer 1310 connects over a standard telephone line to NCC 1100 via switch 1320 and the PSTN. Switch 1320 is a standard PBX or Class 5 switch without ACD functionality.

NCC 1100 controls the routing of calls from customer 1200 to agent 1300. FIG. 1 is a block diagram of the elements of NCC 1100, including High Level Switch (HLS) 1110, ACD server 1120, and Interactive Voice Response unit (IVR) 1130.

HLS 1110 is a network switch, such as a DMS Traffic Operator Position System (TOPS) switch manufactured by Northern Telecom, Ltd. HLS 1110 routes calls from customer 1200 to agent 1300. HLS 1110 preferably contains an interface that facilitates communication with ACD server 1120 to allow ACD server 1120 to control call routing.

ACD server 1120 includes a computer with an Ethernet or Ethernet-equivalent data connection to HLS 1110 and IVR 1130. ACD server 1120 preferably includes an IBM-compatible computer executing Windows NT™, but might include a UNIX™-capable computer, such as an HP model, the IBM Risc 6000, or any other equivalent processor.

ACD server 1120 queues customer calls, records information regarding the availability of agents, controls the routing of calls by HLS 1110 and the operation of IVR 1130, and provides Management Information System (MIS) data. ACD server 1120 also processes network events reported by HLS 1110, and takes appropriate action, such as rerouting calls and releasing called trunks due to busy conditions.

Figure 2:
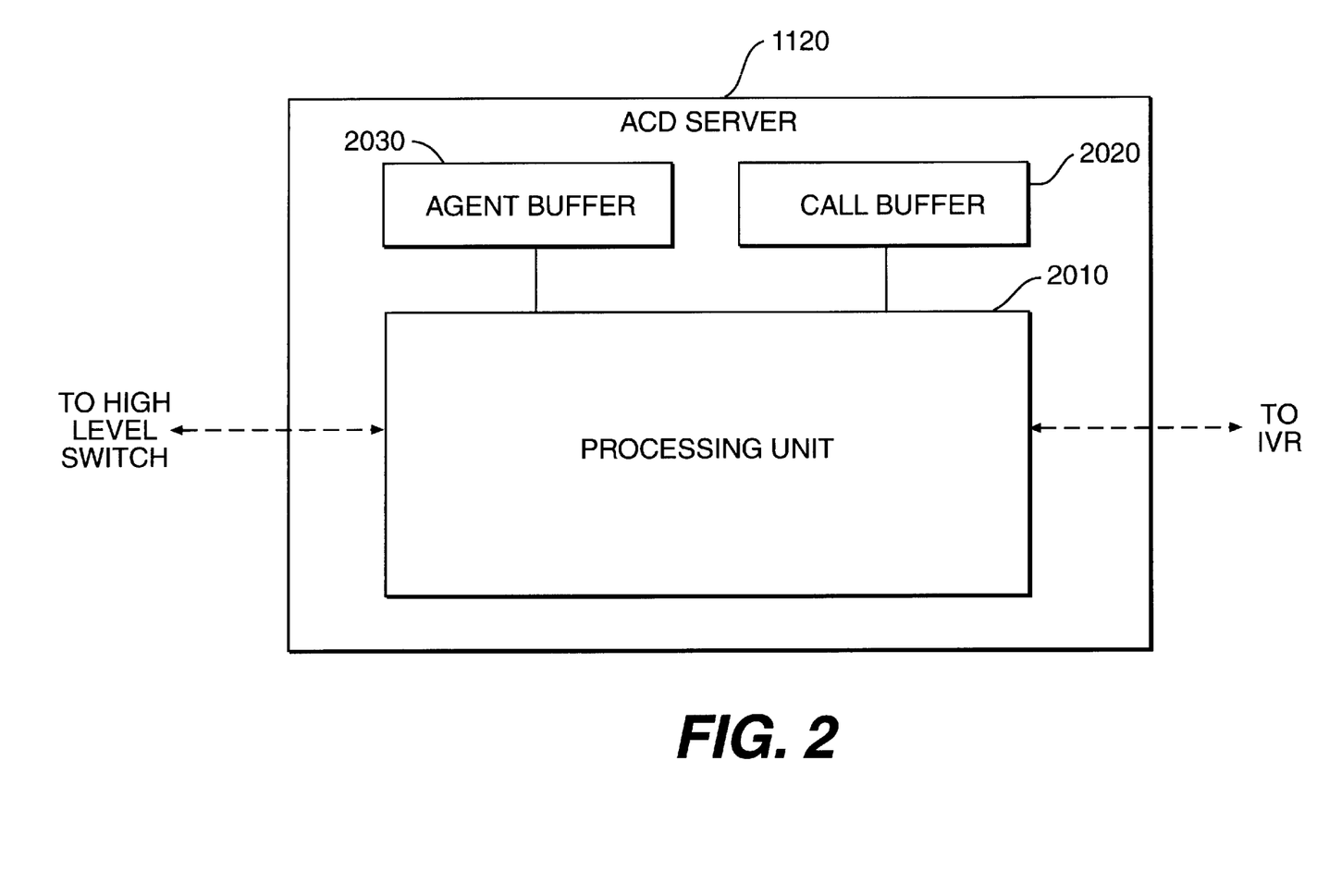
FIG. 2 is a diagram of the components comprising the ACD Server of FIG. 1.

FIG. 2 is a block diagram showing the components of ACD server 1120, including processing unit 2010, call buffer 2020, and agent buffer 2030. Processing unit 2010 tracks agent availability and handles the processing of customer calls, including the queuing of such calls in call buffer 2020 and the routing of these calls to available agents.

Call buffer 2020 preferably includes several call queues arranged by categories, such as by agent team, or by customer call criteria, such as the desired language of the customer. The call queues may also contain priority call queues for faster service by the agents. A call may be placed in a priority call queue, for example, after it has waited in call buffer 2020 longer than a predetermined period of time.

Agent buffer 2030 preferably contains several agent queues. The agent queues can be arranged, for example, by agent team. Each agent queue contains values representing idle agents waiting for a call to service. Similar to the call queues, the agent queues may contain priority agent queues that are searched first when a new call arrives needing service.

The particular queues of calls within call buffer 2020 that an agent services and the queues of available agents within buffer 2030 are predetermined by the operating telephone company, on behalf of the call center service provider. Agents may need to service multiple queues or just one queue. Agents may also need to service different queues at different priorities.

Returning to FIG. 1, IVR 1130 includes a computer, such as a personal computer or a larger mainframe computer, with a voice connection to HLS 1110. IVR 1130 collects information from the customers to aid ACD server 1120 in categorizing the customer calls, storing them in a proper call queue in ACD server 1120, and directing them to an appropriate agent. IVR 1130 plays announcements or music for the customers while awaiting service in a call queue. IVR 1130 also interacts with agents to collect agent status information, such as an agent logging on, logging off, and agent availability.

II. Processing

Figure 3:
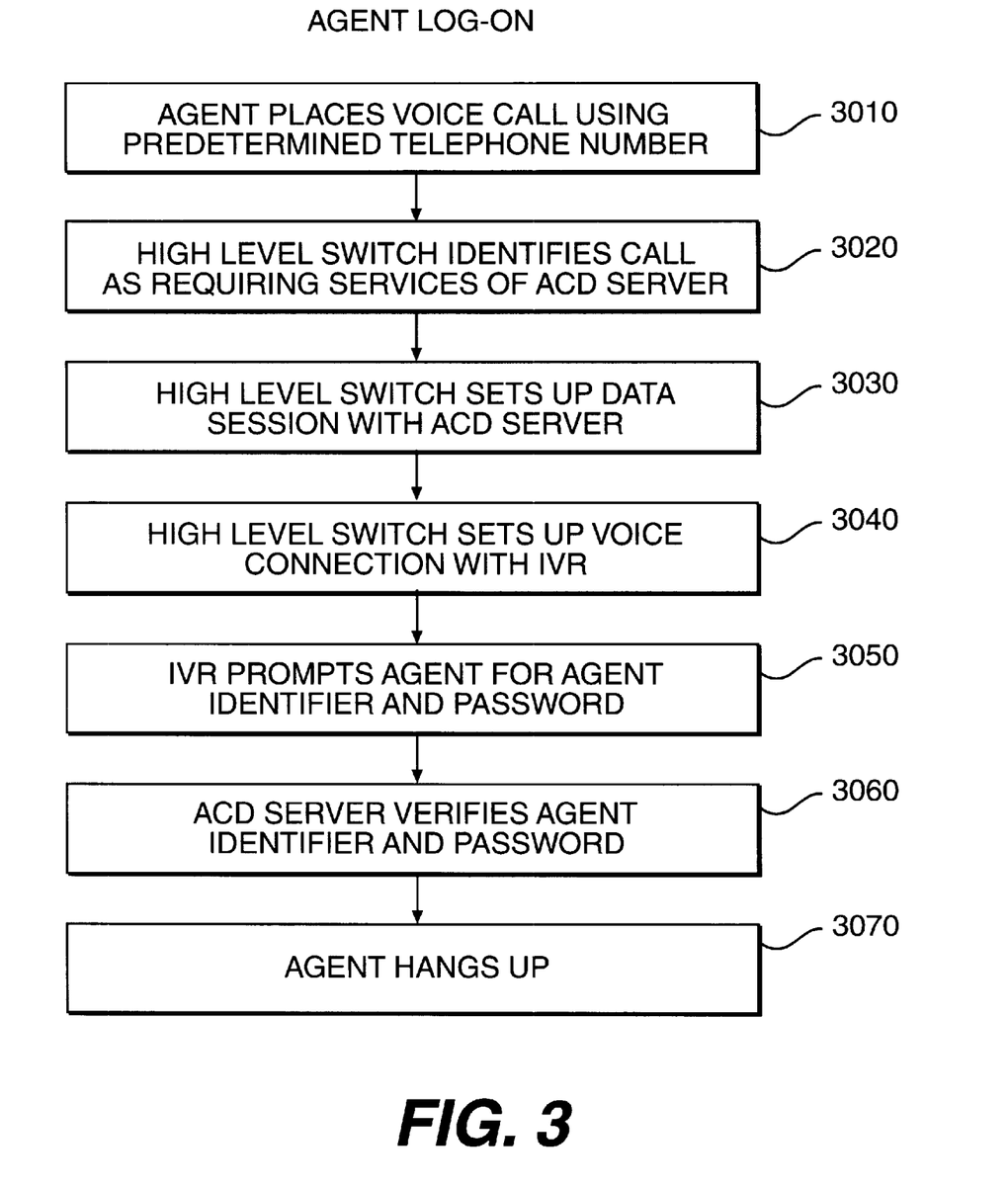
FIG. 3 is a flowchart of the agent log-on activity consistent with the principles of the present invention.

FIGS. 3–6B are flowcharts illustrating the operation of the network call center consistent with the principles of the present invention. FIG. 3 is a flowchart of the agent log-on activity that occurs when an agent, such as agent 1300 in FIG. 1, wants to service customer calls. Agent 1300 places a standard voice telephone call using a predetermined telephone number over a standard telephone line [step 3010]. The predetermined telephone number is established by the operating telephone company on behalf of the call center service provider, is preferably known only to agents of the agent team, and notifies NCC 1100 of agent activity.

Agent 1300's call routes to NCC 1100 through switch 1320 and the PSTN. HLS 1110 receives the call and identifies it as one requiring the services of ACD server 1120 based on detection of the predetermined telephone number dialed by agent 1300 [step 3020]. In response, HLS 1110 sets up a data session between HLS 1110 and ACD server 1120 over a data path, such as an Ethernet or Ethernet-equivalent data path [step 3030]. Once HLS 1110 sets up the data session, HLS 1110 passes information about the call to ACD server 1120. This information preferably includes the calling number and the called number of agent 1300's call.

Using the information supplied by HLS 1110, ACD server 1120 identifies the call as one in which an agent is attempting to log-in to service customer calls. ACD server 1120 might make this identification by comparing the calling number to a database of agent calling numbers, thus identifying agent 1300 as an agent who is not currently logged in.

ACD server 1120 directs HLS 1110 to set up a voice connection between agent 1300 and IVR 1130 [step 3040]. Once HLS 1110 establishes the voice connection, ACD server 1120 instructs IVR 1130 to prompt agent 1300 to enter an agent identifier and a password using DTMF digits or speech [step 3050]. ACD server 1120 verifies the agent identifier and password to ensure that only authorized agents are permitted to log in [step 3060]. If IVR 1130 uses speech recognition, then an additional level of security can be attained by recognizing the speech patterns of authorized agents.

Based on the agent identifier, ACD server 1120 updates internal records indicating the skills agent 1300 has and the queues agent 1300 can serve. At the completion of the dialogue, agent 1300 hangs up, thereby completing the log-in process and indicating agent 1300's availability to service customer calls [step 3070].

Figure 4:
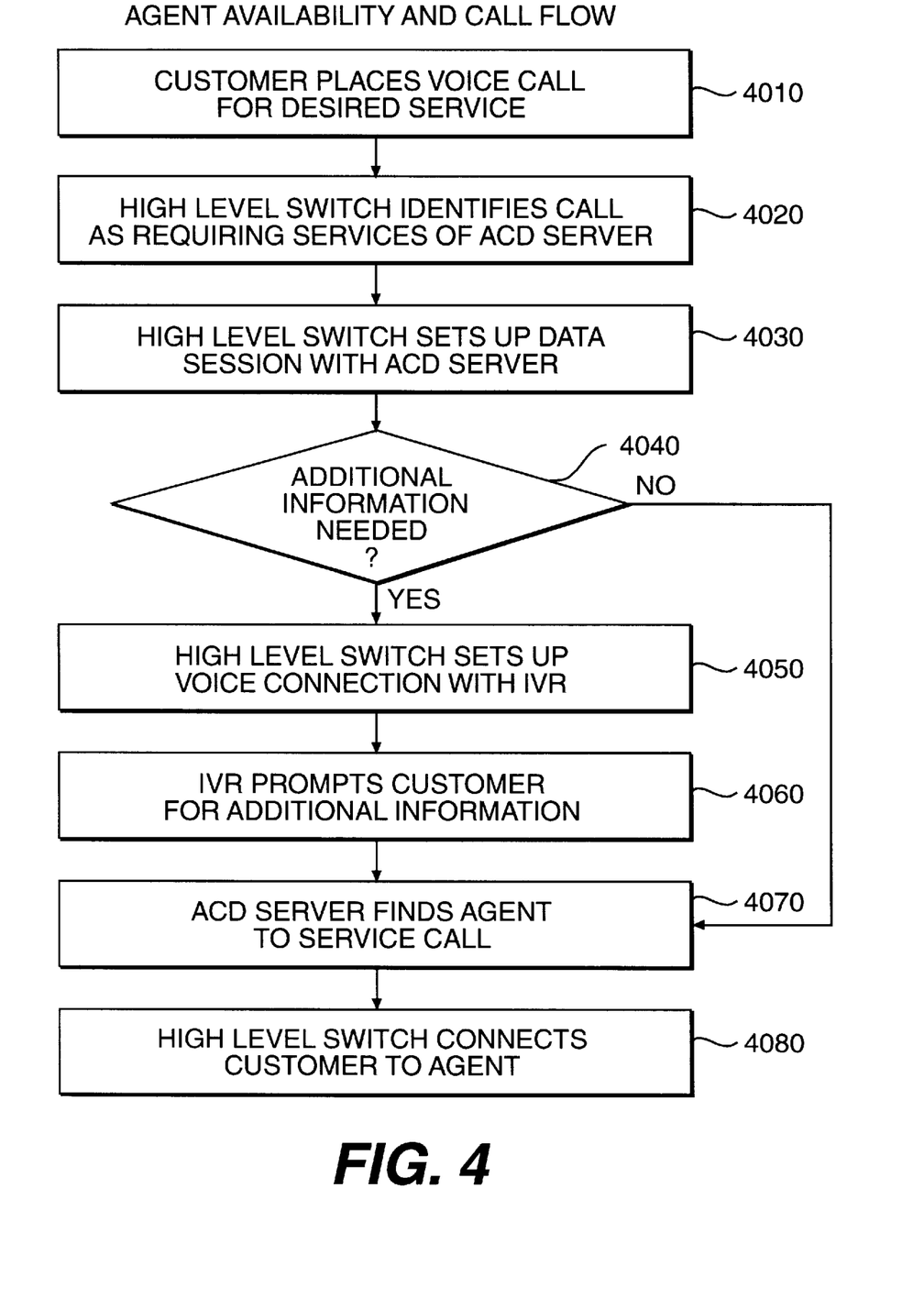
FIG. 4 is a flowchart of the agent availability and call flow activities consistent with the principles of the present invention.

Once agent 1300 logs in, agent 1300 awaits a customer call. FIG. 4 is a flowchart of the agent availability and call flow activities according to the principles of the present invention. A customer, such as customer 1200, places a voice call for a desired service, such as to make a reservation or to order a product [step 4010]. To place the voice call, customer 1200 dials a telephone number, typically a toll free number, for the desired service.

Switch 1220 routes customer 1200's call to NCC 1100 through the PSTN. HLS 1110 receives the call and, from detecting the telephone number customer 1200 dialed, identifies it as a call requiring the services of ACD server 1120 [step 4020]. HLS 1110 then sets up a data session with ACD server 1120 [step 4030] and sends ACD server 1120 call information, including the calling and called telephone numbers. At this point, ACD server 1120 may desire to collect additional information from customer 1200 [step 4040]. The criteria for collecting additional information is preferably preestablished. For example, ACD server 1120 might always desire to collect additional information or might desire to collect additional information only from customers who have not previously called for the particular service.

If ACD server 1120 desires additional information from customer 1200, ACD server 1120 directs HLS 1110 to set up a voice connection to IVR 1130 [step 4050]. Once HLS 1110 connects customer 1200's call to IVR 1130, ACD server 1120 instructs IVR 1130 to prompt customer 1200 for the desired information [step 4060]. Using this information, ACD server 1120 finds from the agent queues the next available agent, e.g., agent 1300, that has the necessary skills to service customer 1200 [step 4070]. Once ACD server 1120 finds the appropriate agent, for our example, agent 1300, ACD server 1120 instructs HLS 1110 to connect customer 1200 to agent 1300 through the PSTN [step 4080].

If ACD server 1120 does not need additional information from customer 1200 [step 4040], ACD server 1120 finds from the agent queues the next available agent, again agent 1300, that has the necessary skills to service customer 1200, given the information ACD server 1120 has regarding customer 1200 [step 4070]. Once ACD server 1120 finds agent 1300, ACD server 1120 instructs HLS 1110 to connect customer 1200's call to agent 1300 through the PSTN [step 4080].

Figure 5:
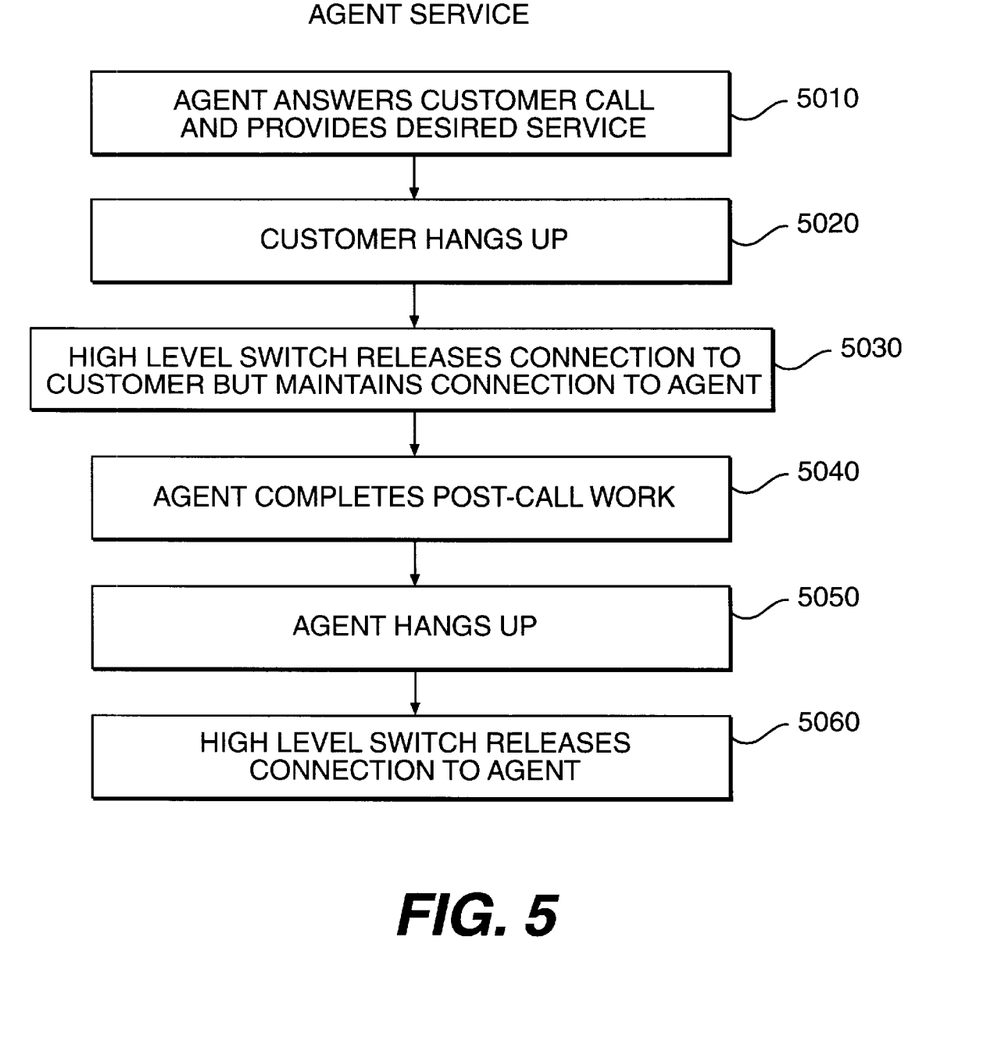
FIG. 5 is a flowchart of the agent service activity consistent with the principles of the present invention.

When agent 1300 receives customer 1200's call, the agent service activity shown in the flowchart of FIG. 5 occurs. Agent 1300 answers customer 1200's call and provides the desired service [step 5010]. At the end of the service interaction, customer 1200 hangs up (places customer telephone 1210 on-hook) [step 5020]. Switch 1220 detects the on-hook state of customer telephone 1210 and reports the on-hook state to HLS 1110 through the PSTN.

HLS 1110, in turn, reports the on-hook state to ACD server 1120. In response, ACD server 1120 instructs HLS 1110 to release the connection to customer 1200 if HLS 1110 has not already done so [step 5030]. In conventional systems, the connection to agent 1300 would automatically be dropped when customer 1200 went on-hook. HLS 1110, however, executes a software routine to maintain separate control over the connections to customer 1200 and agent 1300. This allows HLS 1110 to maintain the connection to agent 1300 after releasing the connection to customer 1200 [step 5030].

After customer 1200 goes on-hook, agent 1300 performs any required post-call work [step 5040]. After finishing, agent 1300 goes on-hook, indicating the availability to service another customer call [step 5050]. Switch 1320 detects the on-hook state of agent 1300 and reports the on-hook state to HLS 1110 through the PSTN. HLS 1110, in turn, reports the on-hook state to ACD server 1120. In response, ACD server 1120 instructs HLS 1110 to release the connection to agent 1300 if HLS 1110 has not already done so [step 5060].

Figure 6A:
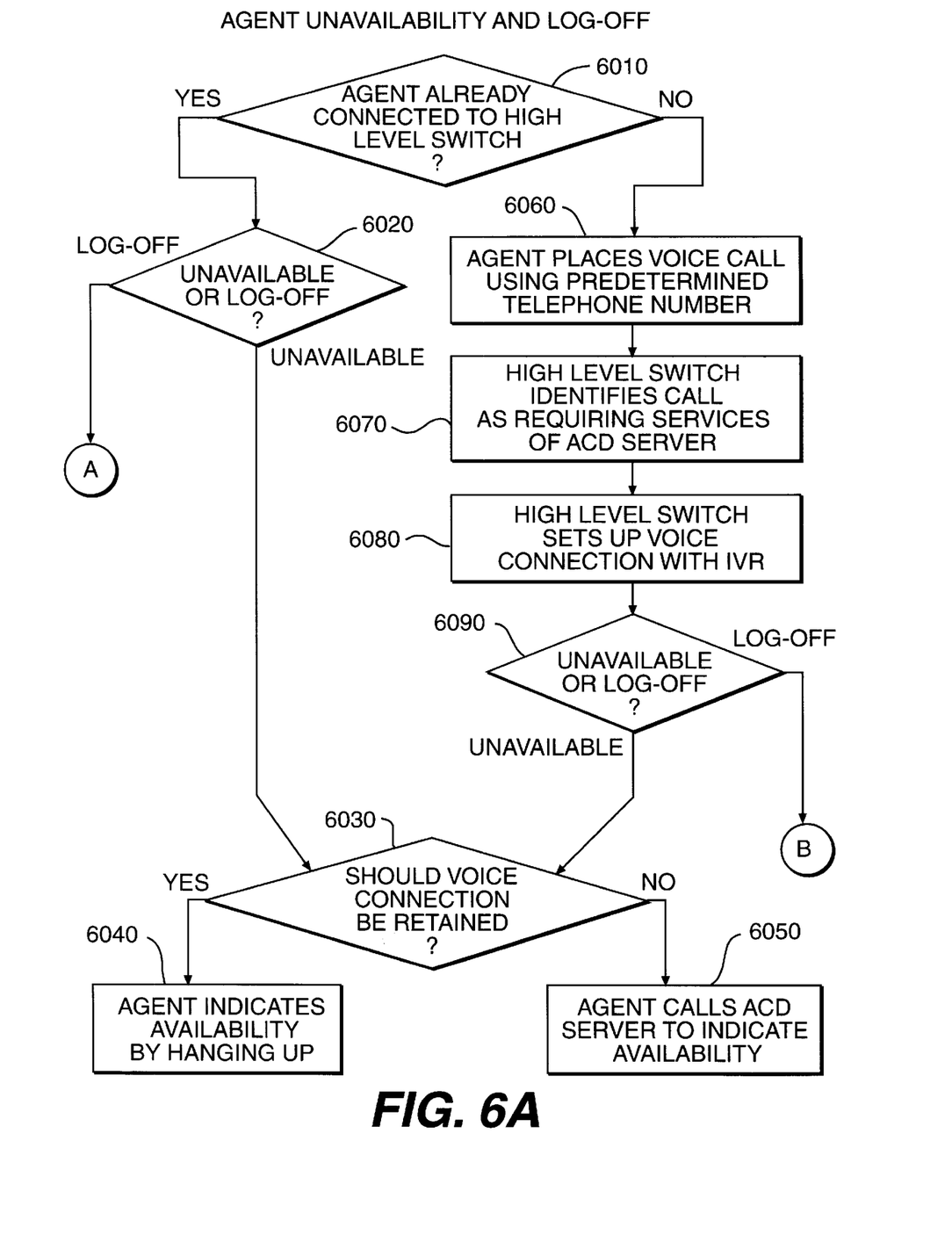
FIGS. 6A and 6B contain a flowchart of the agent unavailability and log-off activities consistent with the principles of the present invention.
Figure 6B:
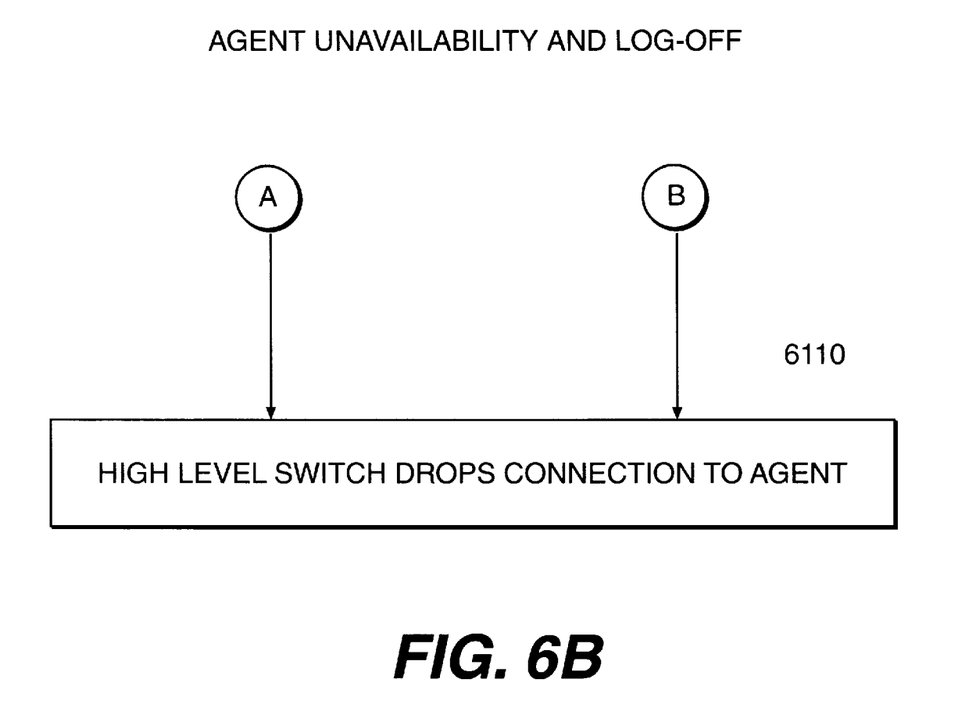

At some point, agent 1300 may want to log-off or become unavailable to service customer calls for a period of time without having to log-off. FIGS. 6A and 6B contain a flowchart of the agent unavailability and log-off activities consistent with the principles of the present invention.

While servicing a customer, such as customer 1200, agent 1300 may desire to become unavailable or log-off when completing the service [step 6010]. When agent 1300 completes service for customer 1200 and customer 1200 goes on-hook, HLS 1110 attaches a detection circuit capable of detecting DTMF digits to the connection maintained with agent 1300. Agent 1300 then informs HLS 1110 of the desire to log-off or become temporarily unavailable by keying in a set of DTMF digits which are interpreted by the detection circuit [step 6020].

If agent 1300 keys in a set of DTMF digits indicating a desire to be temporarily unavailable, HLS 1110 informs ACD server 1120 of agent 1300's unavailability. ACD server 1120 updates its records accordingly, performs any necessary Management Information System (MIS) functions, and might additionally instruct HLS 1110 to connect agent 1300 to IVR 1130 to confirm the status change.

Next, ACD server 1120 determines whether the voice connection to agent 1300 should be maintained [step 6030]. ACD server 1120 could make this determination from DTMF digits keyed in by agent 1300 or through agent 1300's dialogue with IVR 1130. If the voice connection is maintained, then agent 1300 indicates its availability by going on-hook [step 6040]. If the voice connection is not maintained, then agent 1300 places a call using a predetermined telephone number to indicate availability [step 6050].

If agent 1300 wants to log-off instead of becoming temporarily unavailable, agent 1300 keys in a set of DTMF digits which are detected by the detection circuit in HLS 1110 [step 6020]. In response to a log-off indication from agent 1300, HLS 1110 informs ACD server 1120 of agent 1300's desire to log-off. ACD server 1120 updates its records accordingly, performs any necessary Management Information System (MIS) functions, and might additionally instruct HLS 1110 to connect agent 1300 to IVR 1130 to confirm the log-off indication. ACD server 1120 then instructs HLS 1110 to drop the connection to agent 1300 [step 6110].

When agent 1300 desires to become temporarily unavailable or log-off while idle, that is, while not servicing any customer calls [step 6010], agent 1300 places a standard voice telephone call using the predetermined telephone number [step 6060]. HLS 1110 receives the call and identifies it as one requiring the services of ACD server 1120 based on detection of the predetermined telephone number dialed by agent 1300 [step 6070]. In response, HLS 1110 sets up a data session between HLS 1110 and ACD server 1120 and passes information about the call to ACD server 1120.

Using the information supplied by HLS 1110, ACD server 1120 identifies the call as one from an agent. ACD server 1120 directs HLS 1110 to set up a voice connection between agent 1300 and IVR 1130 [step 6080]. Once HLS 1110 establishes the voice connection, ACD server 1120 instructs IVR 1130 to prompt agent 1300 to indicate whether agent 1300 desires to log-off or become temporarily unavailable [step 6090].

If agent 1300 informs IVR 1130 of the desire to become temporarily unavailable, ACD server 1120 updates its records accordingly and performs any necessary MIS functions. ACD server 1120 then determines, through agent 1300's dialogue with IVR 1130, whether to maintain the voice connection to agent 1300 [step 6030]. If so, then agent 1300 indicates availability by going on-hook [step 6040]. If the voice connection is not maintained, then agent 1300 places a call using the predetermined telephone number to indicate availability [step 6050].

If agent 1300 informs IVR 1130 of the desire to log-off, ACD 1120 again updates its records accordingly and performs any necessary MIS functions. ACD server 1120 then instructs HLS 1110 to drop the connection to agent 1300 [step 6110].

III. Agent Connected to Host Computer

Figure 7:
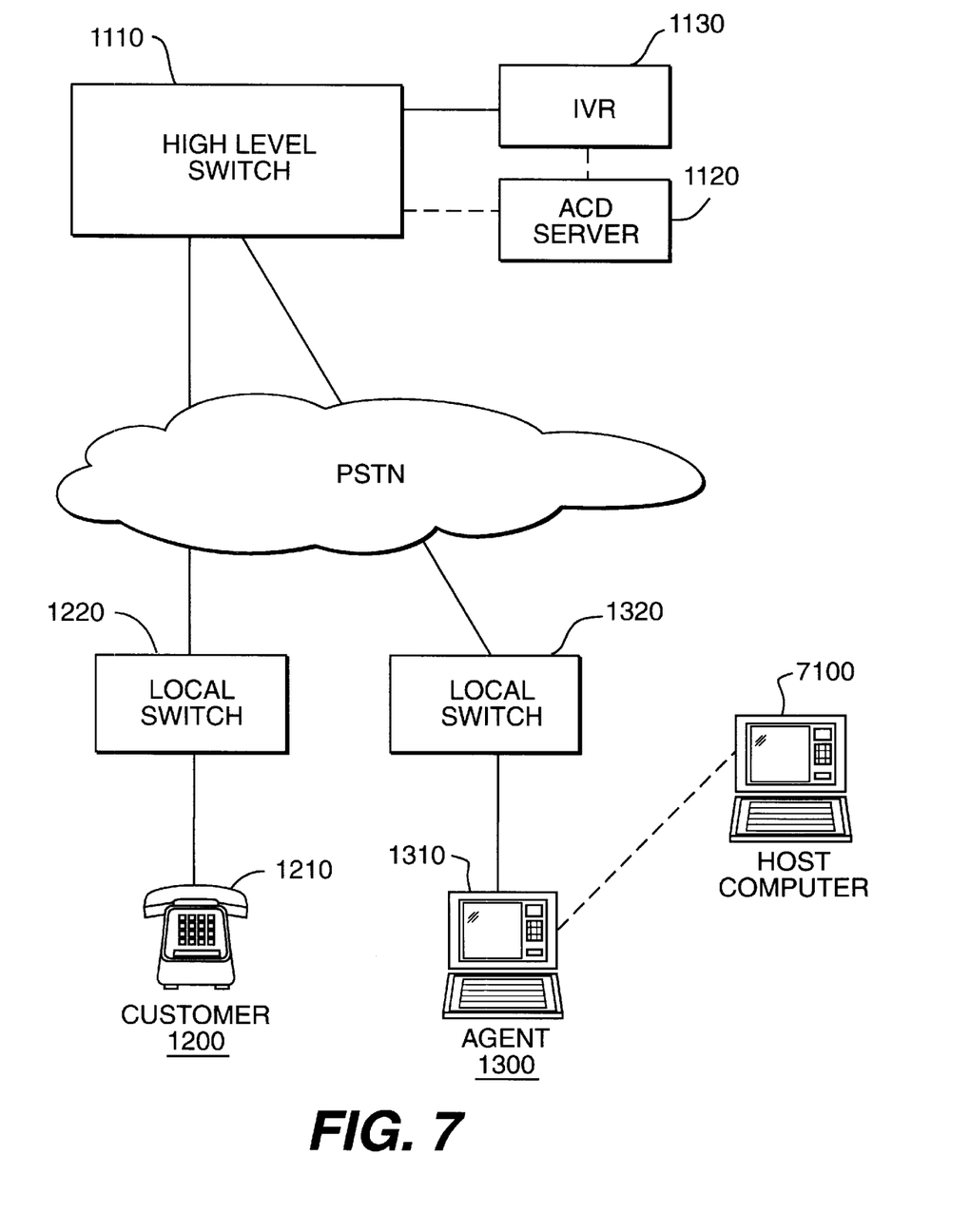
FIG. 7 is a diagram of a modified communications network consistent with the principles of the present invention.

Conventional call centers typically include a host computer from which agents can obtain customer records, place orders, etc. FIG. 7 is a diagram of the communications network of FIG. 1 modified such that agent 1300 has a data connection to host computer 7100 through which agent 1300 obtains customer records, places orders, etc. by conventional mechanisms. The data connection might be any conventional data connection, such as an Ethernet connection, and is completely separate from the standard telephone line used by agent 1300 to service customer calls.

Figure 8:
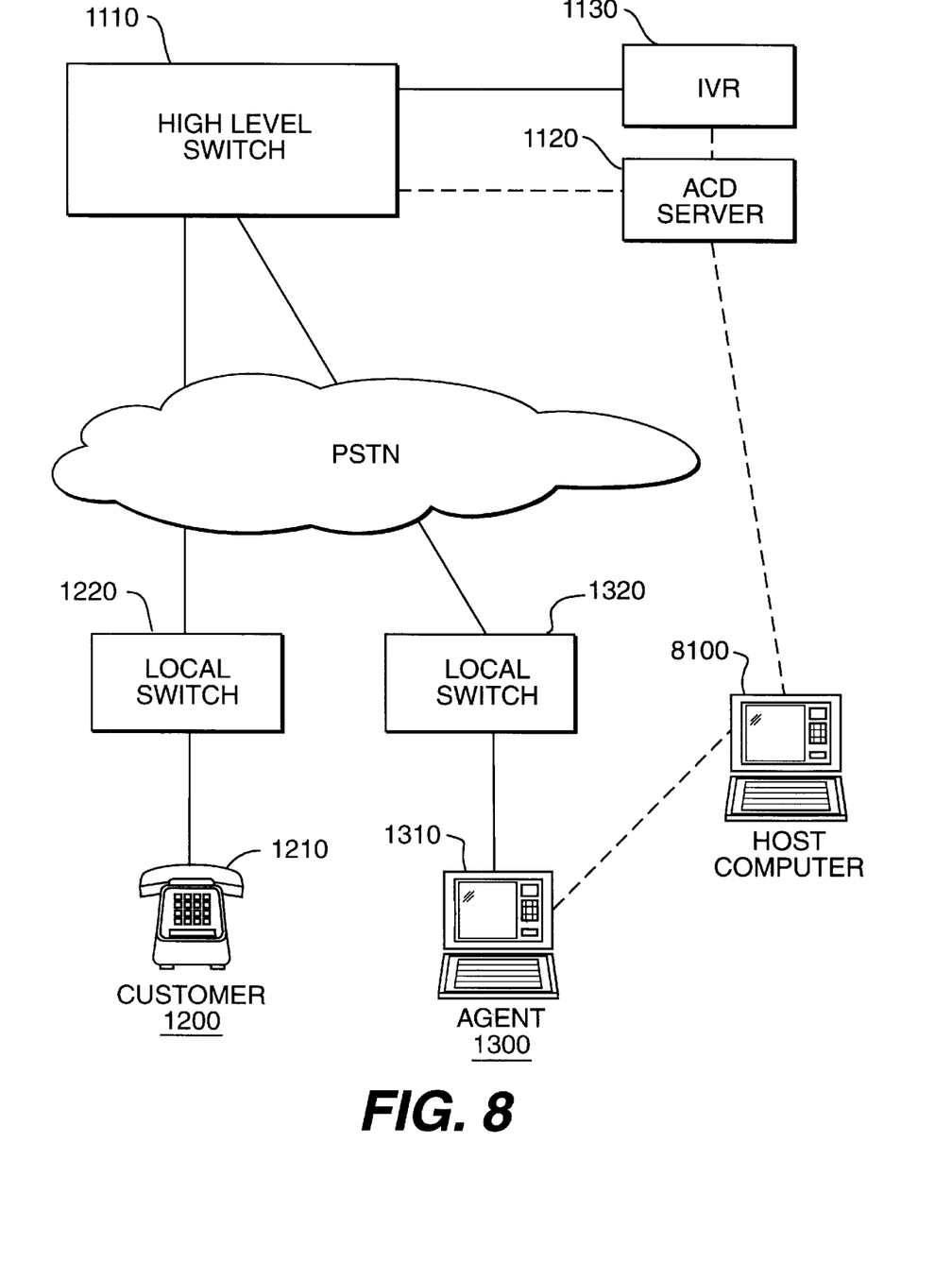
FIG. 8 is a diagram of another modified communications network consistent with the principles of the present invention.

Conventional call centers also commonly use data collected from a customer to drive initial presentation screens on the agents' terminals. FIG. 8 is a diagram of the communications network of FIG. 7 modified such that host computer 8100 connects to both agent 1300 and ACD server 1120 over conventional data paths. Host computer 8100 communicates with ACD server 1120 to retrieve information about customer 1200 by conventional mechanisms. For example, if IVR 1130, in its dialogue with customer 1200, retrieves customer 1200's account number, ACD server 1120 sends this information to host computer 8100. Host computer 8100, in turn, relays the information to agent computer 1310 for display to agent 1300 upon call arrival.

Another benefit of the network arrangement shown in FIG. 8 is that the data connection between agent computer 1310, host computer 8100, and ACD server 1120 can be used to exchange agent status information, such as an agent logging on, logging off, and agent availability.

IV. Conclusion

The systems and methods according to the principles of the present invention support remote agent functions by permitting service agents to service customer calls through a standard local switch over a standard telephone line.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

A network level switch has been described as providing the call management functionality. However, this need not be the case. The call management functionality might alternatively be provided by a local switch. Furthermore, the ACD Server has been described as containing the customer and agent queues. However, the High Level Switch might alternatively provide this queuing.

What is claimed is:

1. A method of servicing calls by a network call center having a network switch connected to an Automatic Call Distribution (ACD) server, the network call center connecting to at least one of a plurality of agent terminals via at least one of a plurality of local agent switches without ACD functionality and a telephone network only over a first standard telephone line, the method comprising:

receiving, at the network-switch, a log-in request from the one agent terminal over the first standard telephone line via the one local agent switch and the telephone network;

interacting with the one agent terminal using telephone signaling over the first standard telephone line to service the log-in request;

receiving, at the network switch, a call requesting service from a customer terminal over a second standard telephone line via a local customer switch and the telephone network;

determining, by the ACD server, the one agent terminal to service the call based on a data session between the network switch and the ACD server;

establishing a connection between the customer terminal and the one agent terminal;

dropping the connection to the customer terminal when the customer terminal terminates the call; and maintaining the connection to the one agent terminal, after dropping the connection to the customer terminal, to permit the one agent terminal to perform post-call work.

2. The method of claim 1, wherein the receiving a call requesting service includes detecting, at the network switch, information from the call.

3. The method of claim 2, wherein the determining the one agent terminal includes selecting the one agent terminal using the detected information.

4. The method of claim 1, further comprising:

identifying, by the network switch, that the call requires service by the ACD server; and establishing a data session between the network switch and the ACD server when the call has been identified as requiring service by the ACD server.

5. The method of claim 1 wherein the network call center further includes an interactive voice response (IVR) unit connected to the network switch and the ACD server; and wherein the interacting with the one agent terminal includes prompting, by the IVR unit, the one agent terminal for agent information to authenticate the one agent terminal.

6. A network call center that processes calls in a telephone network having a plurality of customer terminals coupled to a plurality of local customer switches and a plurality of agent terminals coupled to a plurality of local agent switches, the network call center connecting to at least one of the agent terminals via at least one of the local agent switches without Automatic Call Distribution (ACD) functionality and the telephone network only over a first standard telephone line and at least one of the customer terminals connecting to at least one of the local customer switches that has no ACD functionality over a second standard telephone line, the network call center comprising:

an interactive voice response unit that interacts with the at least one agent terminal using telephone signaling over the first standard telephone line to gather information regarding a status of the at least one agent terminal;

a high level switch that receives a call requesting service from one of the customer terminals over the second standard telephone line via one of the local customer switches, that routes the call to one of the agent terminals to establish a connection from the one customer terminal to the one agent terminal, and that drops the connection to the one customer terminal while maintaining the connection to the one agent terminal when the one customer terminal terminates the call; and an ACD server that determines the one agent terminal to service the call based on a data session between the high level switch and the ACD server, and that controls the high level switch to route the call to the one agent terminal.

7. The network call center of claim 6, wherein the high level switch includes means for detecting information from the call.

8. The network call center of claim 7, wherein the ACD server includes means for selecting the one agent terminal using the detected information.

9. The network call center of claim 6, wherein the high level switch includes means for identifying that the call requires service by the ACD server; and means for establishing a data session between the high level switch and the ACD server when the call has been identified as requiring service by the ACD server.

* * * * *